June 1, 1943.                M. B. MENTLEY                2,320,787
                                BROACH
                          Filed April 29, 1940
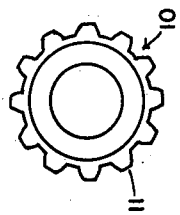
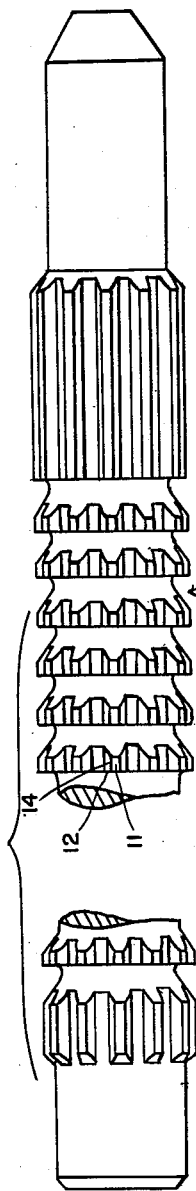
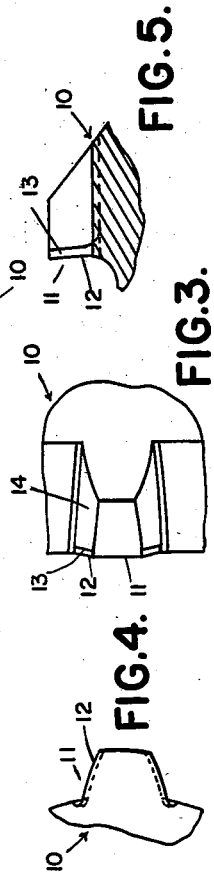
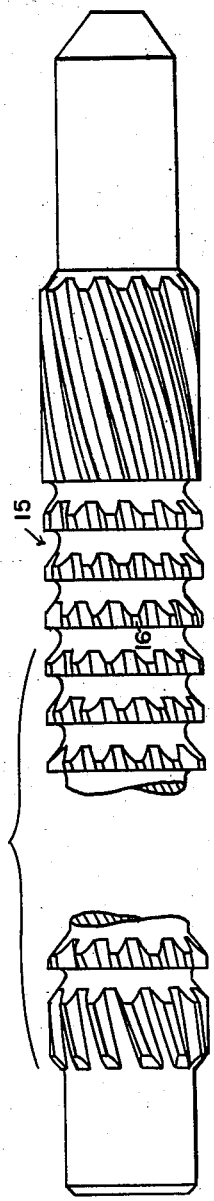
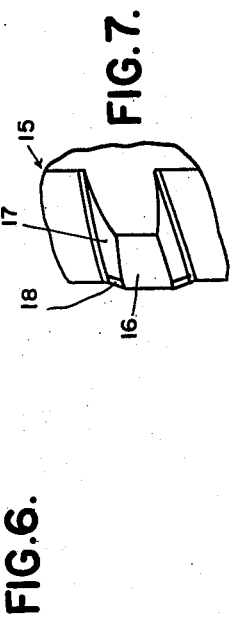
INVENTOR.
MAX B. MENTLEY
BY
ATTORNEYS Patented June 1, 1943

2,320,787

UNITED STATES PATENT OFFICE 2,320,787

BROACH

Max B. Mentley, Detroit, Mich., assignor to National Broach & Machine Company, Detroit, Mich., a corporation of Michigan Application April 29, 1940, Serial No. 332,349

6 Claims. (Cl. 29—95.1)

The present invention relates to broaches and more particularly to a broach relieved in a novel manner, and apparatus and method for so relieving the broach.

More specifically the invention relates to a broach having a series of involute cutting teeth. These teeth may be arranged in a straight series or a helical series, as desired. In the past it has been the practice to relieve broach teeth of this type back of the cutting edge. This relief is necessary to produce the best cutting action. Preferably a narrow land is provided immediately in back of the cutting edge, and the relief therefore terminates a slight distance from the actual cutting edge.

Previously, involute cutting teeth on a broach were relieved by using a form grinder having a contour complemental to the desired broach tooth contour. To provide relief, this form grinder was fed radially into the work back of the cutting edge, thus relieving the side surfaces of the broach teeth. As will be evident, this prior method produced an uneven land and also produced an uneven back-off angle.

According to the present invention the side surfaces of the broach teeth back of the cutting edge are relieved by a grinding method in which a plane surfaced grinder is employed. The broach is moved relative to the plane surfaced grinder with a rolling, generating motion. The grinder is set at a compound angle relative to the broach. This compound angle includes an angle adapted to produce helically relieved side surfaces extending at a predetermined lead, and an angle selected with reference to the generating, rolling motion so as to produce the desired pressure angle. Obviously, by this method the lands may be of uniform width, and the back-off angle will be uniform when measured at any point from top to bottom on the side of the cutting tooth.

These results are important and, as will be obvious, contribute to the current utility and longevity of the broach.

It is accordingly an object of the present invention to provide helically relieved sides on involute broach teeth.

It is a further object of the present invention to provide broach teeth having lands of uniform width in back of the cutting edge and being relieved in back of the lands.

It is a further object of the present invention to provide involute broach teeth having lands of uniform width in back of the cutting edge, and having helically relieved surfaces providing uniform back-off in back of said lands.

It is a further object of the present invention to provide a broach having a helical series of involute cutting teeth, each tooth of which is provided with a uniform land in back of the cutting edge, and each tooth of which is provided with helically relieved involute surfaces in back of the land providing a uniform back-off angle.

It is a further object of the present invention to relieve broach teeth by a generating, grinding action.

Other objects of the invention will be apparent as the description proceeds, and when taken in conjunction with the accompanying drawing wherein:

Figure 1 is a side elevation of a broach illustrating the present invention;

Figure 2 is an end view thereof;

Figure 3 is an enlarged view of a portion of Figure 1;

Figure 4 is an end view of Figure 3;

Figure 5 is a cross section on the line 5—5 of Figure 4;

Figure 6 is a view similar to Figure 1 of a modified broach;

Figure 7 is an enlarged view of a portion of Figure 6.

Referring first to Figures 1 to 5, inclusive, I have for purposes of illustration chosen to show a spur broach 10 having straight series of involute cutting teeth 11. Each cutting tooth 11 has sharp cutting edges 12 back of which is a narrow land indicated at 13. In back of the land 13 the side surface 14 of the teeth is relieved. According to the present invention the relief of the side surface 14 of the teeth 11 is helical. The land 13 is of uniform width from top to bottom. The back-off angle, that is the angle at which the relieved side surface 14 extends to the general angle of the series of teeth, is likewise uniform from top to bottom.

It will be understood that the same remarks apply to a broach 15 having a helical series of teeth 16, as illustrated in Figures 6 and 7, the only difference being that the side surfaces 17 of these teeth in back of the lands 18 would extend at a helical angle slightly different from the general helical angle of the series of teeth.

It will be appreciated that if the side surfaces of the teeth 11 were relieved as is now conventional by plunging a form grinder radially inward of the broach in back of the cutting edge, this would produce a land of uneven width and the back-off angle of the relieved side surface would vary from top to bottom of the teeth.

According to the present invention this side surface is relieved by a rolling, generating motion relative to the grinder so that the involute relieved side surface may have the desired characteristics.

While I have illustrated and described two broaches, it will be understood that these have been described in detail solely to enable those skilled in the art to practice the invention the scope of which is indicated by the appended claims.

What I claim as my invention is:

1. A spline broach having a series of involute cutting teeth thereon, said teeth being relieved back of their cutting edges with involute relief.

2. A spline broach having a series of involute cutting teeth thereon, said teeth being relieved back of their cutting edges, the relieved sides of said teeth being of involute contour and having a lead slightly different from the lead of said series of teeth.

3. A helical involute broach having helical series of involute teeth, a land back of the cutting edges of said teeth of uniform width from top to bottom, the sides of said teeth back of said land having helical involute relief so as to provide a constant back-off angle from top to bottom.

4. A broach having a plurality of series of cutting teeth formed thereon, each series of teeth extending generally longitudinally of the broach, the teeth of each series being of involute profile, the sides of each tooth being helically relieved.

5. A broach having a plurality of series of cutting teeth formed thereon, each series of teeth extending generally longitudinally of the broach, the teeth of each series having cutting edges of involute shape, the side surfaces of said teeth in back of said cutting edges being of the same involute shape, but helically relieved to provide cutting clearance.

6. A broach having a plurality of series of cutting teeth formed thereon, each series of teeth extending generally longitudinally of the broach, the teeth of each series having cutting edges of involute shape, the side surfaces of said teeth in back of said cutting edges being unrelieved to provide narrow lands of uniform width from top to bottom, the side surfaces of said teeth in back of said lands being of the same involute shape, but helically relieved to provide cutting clearance.

MAX B. MENTLEY.